Patented Oct. 15, 1935

2,017,561

UNITED STATES PATENT OFFICE 2,017,561

METHOD OF PRODUCING CRYSTALLINE HYDRATES OF ALKALI METAL SILICATES

Chester L. Baker, Berkeley, Calif., assignor to Philadelphia Quartz Company of California, Ltd., Berkeley, Calif., a corporation of California No Drawing. Application July 18, 1931,
Serial No. 551,785

18 Claims. (Cl. 23—110)

The present invention relates to new forms of crystalline hydrates of alkali metal silicates as products of manufacture, as well as to an improved method for their production. It is particularly concerned with the crystalline hydrates of sodium silicates, for example sodium metasilicate, although the principles involved are applicable to the production of other hydrates of the alkali metal silicates generally, such, for example, as sodium disilicate, sodium sesquisilicate, potassium disilicate, lithium metasilicate, etc. However, since the present invention has been especially developed in connection with the production of crystalline hydrates of sodium metasilicate, it will be described herein in its relation to this particular group of compounds.

As stated in my earlier application, Serial No. 465,245, filed on July 1, 1930, now Patent Number 1,898,707, sodium silicate, as generally understood, refers to solid, glass-like bodies containing sodium oxide and silica in varying ratios, or to solutions of these in water. These products usually contain not less than one and one-half parts of silica ($SiO_2$) for each part of sodium oxide ($Na_2O$) and the solutions are syrupy, sticky, liquids which have little tendency to crystallize under ordinary conditions. Certain crystalline sodium silicates had been known to science prior to the application above mentioned but they had not attained the significance in industry which they merit, principally because of difficulties in preparing them in acceptable physical form and the problems which arise in attempting to use them as theretofore made.

In my prior application, Serial No. 465,245, before referred to, a method of preparing hydrated alkali metal silicates adapted to commercial utilization was described, according to which alkali metal silicate solutions of adjusted composition were caused to crystallize and set to solid masses which were subsequently and necessarily ground to adapt them to commercial purposes.

Prior to that invention, hydrated alkali metal silicates had been crystallized from mother liquors which were sticky in character and difficult to remove from the crystals, in such manner that the resulting product or mixture of products tended to agglomerate into solid masses difficult to handle. Previous products of this kind were characterized by a certain instability, due perhaps to unregulated solidification of incompletely removed mother liquor, transition from one hydrate to another and/or other causes. For instance, Bacon in British Patent No. 24,226 of the year 1905 and Verrier in British Patent No. 921 of 1908 have described the preparation of cakes of sodium metasilicate hydrates which they state could be ground, but these also, due to the heterogeneous mixtures of crystals and unseparated mother liquors or to mixtures of crystals, were unstable and found no substantial use in industry.

I have now found improved means for the preparation of hydrated alkali metal silicates by which discrete crystals are grown in mother liquors, separated therefrom under conditions which favor low retention of mother liquor, and adherent mother liquor caused to crystallize, for the most part as a homogeneous addition to the crystals themselves, whereby products are obtained which are of improved purity, dry, dust free, and non-adherent, free from caking, and substantially uniform in size without the necessity of grinding and/or screening, although these additional steps may be desirable if grains finer than can be conveniently separated from the mother liquors be required, or in some cases where it may prove more economical to grow large grains and grind subsequently.

The following discussion directed to the hydrates of sodium metasilicate will render still more clear the nature of the invention.

When hydrated sodium metasilicate is caused to crystallize from solution at ordinary temperatures, the remaining mother liquor is very viscous and sticky, with the result that the crystals separated from it are wet and sticky and thoroughly unsatisfactory for commercial use. Now, I have discovered that these mother liquors which are very viscous and sticky at ordinary temperatures become quite thin and fluid at higher temperatures, so that if a particular hydrate is caused to crystallize at a temperature as close to its melting point as is practical, the crystals can be removed mechanically, leaving a much smaller amount of mother liquor adhering to them.

I have further discovered that the solubility of sodium metasilicate is so great at such an elevated temperature that the mother liquor adhering to the crystals contains very little excess water, so that when the crystals are separated from the mother liquor and cooled to room temperature the small quantity of adherent mother liquor crystallizes almost completely onto the crystal faces. If the crystal mass is kept under agitation during the cooling no grinding is necessary and the resultant product is dry and free flowing, with no tendency to cake or agglomerate so long as the temperature is kept well below the melting point of the pure hydrate.

In case the material is to be stored under conditions which might approach the temperature at which the crystals are removed from the mother liquor, it becomes desirable to remove all excess moisture adhering to them. This excess moisture is present as a saturated sticky solution which tends to take up moisture from the air, which in turn dissolves its quota of the crystal substance and at the higher temperature makes a sticky mass which it has heretofore been considered impossible to avoid. I have discovered, however, that if the temperature of the crystals is maintained at a point approaching the melting point of the particular hydrate and heated air passed over them at this temperature, the excess moisture will be removed. The same object may be accomplished by subjecting the material to a vacuum while preferably maintained at the above described temperature. In either case, whether the material is merely cooled in order to crystallize the mother liquor onto the crystal faces or is dried as above described with the resultant crystallization of the dissolved material from the mother liquor onto the crystal faces, it is desirable to keep the crystals agitated during the cooling and/or drying so that they will not adhere together. If the crystals were allowed to adhere, the resultant mass might have to be crushed or ground in order to produce a satisfactory commercial product.

With all of the foregoing in mind, the principal objects of my invention may be said to reside in: (1) the production as a new article of manufacture of a definite hydrate of an alkali metal silicate, such as sodium metasilicate, in the form of individual particles or aggregates of particles bounded substantially by crystal faces; (2) the production of such an article in the form of particles of substantially uniform size; (3) the production of such an article in solid freely-flowing, dust-free condition; (4) the production of such an article which is substantially free from admixture with other alkali metal silicate hydrates; (5) the production of such an article which is substantially free from impurities, and (6) the production of such an article in the form of dry, stable, non-caking crystals or crystalline aggregates.

The objects of my invention also include the provision of (1) an improved method for preparing crystalline hydrates of alkali metal silicates, such as sodium metasilicate, by means of which it is possible to produce a product having the advantages above set forth; (2) the provision of a method by which crystalline hydrates of alkali metal silicate, such as sodium metasilicate, can be prepared free of adherent mother liquor; (3) the provision of a method of the character desccribed by means of which it is possible to transform into crystal form mother liquor which may adhere to the crystals; (4) the provision of a method of preparing crystalline hydrates of alkali metal silicates, such as sodium metasilicate, of improved purity and of an even grain size substantially free of dust, as well as of inconveniently large particles. (The dust of hydrated alkali metal silicates is irritating to the organs of respiration).

In connection with all of the foregoing objects, my invention involves the production of discrete crystals of the silicates in question as distinguished from solid crystal masses which must be subsequently ground to the desired size in the manner disclosed in my previous application above referred to. In other words, the present process results in the production of discrete crystals which are dry and, therefore, non-adhering, and it is an object of my invention to produce such crystals as distinct from massive crystalline bodies which must be crushed for use as in my earlier application. In this way I am enabled to obtain relatively uniform size in the crystals which is a feature of distinct practical advantage in handling of these materials.

I will now describe a specific example for the carrying out of my invention as it may be applied to the production of sodium metasilicate pentahydrate.

An aqueous silicate solution is prepared having a composition approximately 1.00 $Na_2O$ .995 $SiO_2$ 5.9 $H_2O$. This is slightly more alkaline than sodium metasilicate, and contains more water than the pentahydrate. This solution will be found to test approximately 59° Baumé at its boiling temperature. The solution may be prepared in any manner desired, although the preferred practice consists in adding a solution of caustic soda to a commercial silicate of soda solution, heating until the reaction is completed and bringing it to the desired concentration.

The preferred apparatus is a closed crystallizing tank with slow moving stirring devices and jacketed walls through which water or other media for accurate control of the temperature may be circulated.

Crystallization of sodium metasilicate pentahydrate may then be effected by adjusting the temperature of the liquid to 65° C. and seeding with approximately 5 pounds of a suitable, fine grained, crystalline sodium metasilicate pentahydrate for each 2000 pounds of solution.

The seeded solution is now continuously stirred in such a manner that the temperature of its various parts is substantially the same and at a rate which prevents any considerable sedimentation of the crystals. If these conditions are met the exact form of apparatus is not important.

After the seed has been added and well distributed throughout the liquor, heat is removed from the liquor by circulating water of controlled temperature through the jacket of the crystallizing vessel in such a way that the seed crystals grow without forming any large number of new nuclei as would be the case if the temperature of the liquor were suddenly reduced. The exact schedule of temperature change will vary more or less with the type of apparatus, but the following data of an actual run may be taken as illustrative:—After seeding at 65° C. the temperature of the liquor was held for 10 hours at this temperature. By the 20th hour it had increased to 66° C. which was maintained until the 40th hour. By the 50th hour the temperature had again reached 65° C. and the crystals had grown to a size suitable for centrifuging.

The course of crystallization may be followed and the rate of crystallization regulated by frequent examination of the crystal growth. In the early stages samples may be examined under the microscope with polarized light. If too many crystal nuclei appear to be forming as is determined by experience, the rate of heat removal may be reduced or in some instances the liquor may be slightly warmed. After approximately 7 hours crystals attain such a size that they may be seen when a little of the sticky mass is spread upon a piece of glass and held up to the light. At this stage the liquid when rubbed between the fingers feels definitely grainy. As the crystals grow in size the mass becomes visibly thicker. In the specific instance cited, thickening became apparent about 24 hours after seeding. From this point on, the progress of crystallization may be observed by removing small samples and centrifuging them for examination. When the crystal growth has proceeded to a point yielding a viscous magma containing 40 or more percent of its weight of crystals the magma may be centrifuged in the known manner, taking care to avoid any considerable reduction of temperature in the process. The temperature of centrifuging should be below the melting point of the crystals in contact with the mother liquor and within this limitation as high as may be convenient, to keep the residual mother liquor sufficiently fluid. Any suitable type of commercial centrifuge may be used. Crystals separated on the centrifuge remain moist with residual mother liquor which cannot be completely removed by the centrifuging process. They should be removed from the centrifuge and subjected to gentle agitation to prevent agglomeration as they cool and/or dry. Any suitable method of drying such as the use of vacuum or application of air at appropriate temperatures below the melting point of the crystals may be used. In this way adherent mother liquor is caused to crystallize on the surface of the crystal units substantially as a homogeneous part thereof. This results in a dry, free-flowing and non-caking product.

By the foregoing procedure a magma may be obtained which contains between 40 and 50% by weight of crystals in the mother liquor and the cooled and/or dried product after separation of the mother liquor, will be characterized by substantially uniform size, freedom from dust, and free-flowing characteristics.

As a second example of how my invention may be carried out, I will now describe the preparation of sodium metasilicate enna-hydrate, $Na_2SiO_3 \cdot 9H_2O$. An aqueous solution of sodium metasilicate ($Na_2SiO_3$) is prepared whose concentration is adjusted to a Baumé test of about 42.6° at 100° C. This solution is then cooled to 45° C. At this point a quantity of finely ground $Na_2SiO_3 \cdot 9H_2O$ crystals may be added, if necessary, to start crystallization, and thoroughly stirred into the mixture. Usually five pounds of this seed is sufficient for two thousand pounds of solution. The seeded solution is thereafter thoroughly and continuously stirred and its temperature gradually reduced. For example, a suitable rate of cooling might be 0.2° C. per hour. This rate of cooling may be continued for ten hours. The temperature should then be allowed to fall at the rate of 0.1° C. per hour until the temperature of 42° C. has been reached. This temperature should then be maintained and agitation of the mass continued until the crystals have grown to the desired size. They may then be removed from the mother liquor by centrifuging, or any other suitable mechanical means, and either cooled while being agitated or dried by passing warm air over them at a temperature of, say, 45° C. while being agitated. The resultant product will consist of crystals of $Na_2SiO_3 \cdot 9H_2O$ of substantially uniform size. Individual and discrete crystals predominate but there will be some small aggregations of crystals. In all cases the particles will be bounded by crystal faces, and the product will be dry and free flowing.

In proceeding in accordance with this invention it is very important that the temperature of the mother liquor after seeding be not reduced at too rapid a rate. I have found that the rate indicated in the foregoing example gives excellent results, but, of course, the technic of the crystallization process may be varied considerably as practice and experience may dictate. For example, the crystals will grow in liquids of different concentration or composition and temperature must be regulated accordingly.

The proper regulation of the number of nuclei is an important feature for attaining a product of the desired characteristics. If there are too many nuclei, crystallization may cause the magma to stiffen enormously or even set before the individual crystals have grown to the desired size. If there are too few nuclei, the period of crystallization will be inordinately prolonged and the crystals will tend to become too large. It will be obvious to those skilled in the art that the regulation of the process is necessarily a matter of experience and skill.

It should also be pointed out in this connection that once the foci of crystallization have been established, they may be caused to grow into sizable crystals by slowly evaporating the solution while holding the temperature below the melting point of the desired hydrate. This can be accomplished conveniently in a vacuum evaporating pan. Such a procedure yields a product very similar to that obtained by slow cooling of the solution, and it should be understood that either method can be used.

It is contemplated that other devices and methods for regulating the rate of crystal growth, numbers of crystal nuclei formed and size of crystals produced, familiar to those skilled in the art of crystallization, may be available for carrying out this invention. Such, as an example, is the device of adding a less concentrated liquor or water to an original seeded liquor, creating the condition whereby crystal nuclei already present will continue to grow but no new nuclei form.

It is further contemplated that the crystalline mass, after separation of the mother liquor and prior to the drying and/or cooling step which effects crystallization of the mother liquor, as described, may be washed if desired in any suitable manner to remove adherent mother liquor, as by use of less viscous silicate solutions, silicate solutions of lower concentration than that of the mother liquors, or by any other suitable means evident to those skilled in the art.

It should be understood, of course, that the initial solution can be prepared and the seed can be selected so as to produce any desired hydrate, the pentahydrate and ennahydrate being mentioned in the foregoing description merely by way of example. The feature to remember is that crystallization should be carried out while the mother liquor is of relatively low viscosity and where the solubility of the crystals is relatively high. The separation of the mother liquor is preferably carried out at substantially the temperature of crystallization or at a higher temperature, which is limited, however, by the melting point of the crystals in contact with the mother liquor. In the case of the pentahydrate mentioned in the above example the melting point is 71.8° C. (for the pure compound in the air) and the centrifuging took place at approximately 64° C. Other hydrates have different melting points so that different temperatures may be encountered in carrying out the process. The lower limit of temperature for centrifuging may be determined either by the viscosity of the mother liquor, the rate at which new crystal nuclei will develop in each particular case, or by the appearance of a second solid phase.

In producing other hydrates seeding should be effected with a quantity of the crystalline hydrate desired. It should also be noted that in some cases it may not be necessary to add a quantity of the crystalline hydrate desired to act as seed, as crystal nuclei will sometimes form spontaneously. In all cases it is preferable to remove heat from the crystallizing mass at such a rate that the temperature is either maintained substantially constant or reduced gradually.

It should be pointed out that the method herein described permits of considerable variation in the concentration of the original liquor, a condition which cannot be tolerated in a process where the whole of the batch goes straight through to the finished product, as in the making of crystallized masses to be ground.

By my improved method the pure compound only is caused to crystallize so that any impurities in the composition or purity of the batch will affect the composition of the mother liquor but will have very little influence on the composition of the crystals.

It will be evident, however, that in some cases the small amount of residual mother liquor, wholly or in part, may advantageously be caused or allowed to crystallize as a predetermined solid phase different from the basic crystal, with the production of a material even then of a purity and stability substantially improved over prior art products.

I should like to point out that in practicing the present invention it is not always necessary that a 1—to—1 ratio of silica to sodium oxide be adhered to, but that it may be advantageous to effect crystallization from solutions in which the silica to sodium oxide (or other alkali) ratio shall be widely different.

In some cases conditions may arise whereunder crystallization of mother liquor adherent after mechanical separation of the bulk thereof may not be readily effected by cooling and/or drying the crystals as heretofore described, as for example in cases where the major crystallization has been completed in an especially alkaline mother liquor or where impurities in the mother liquor prevent. Such a condition generally may be met by recrystallization which serves to reduce the concentration of interfering substance in liquor adhering to the newly formed crystals, or by washing the crystalline particles with a solution of the particular hydrate involved or a solution equivalent thereto, after which the residual wash liquor may be solidified according to the normal procedure for crystallizing mother liquors. Either procedure gives rise to the production of a particularly pure product.

It will be evident to those skilled in the art that the choice of conditions for carrying out my invention will be greatly aided by consideration of equilibria according to the phase rule. Broadly stated, in these terms, for any system which may be expressed in terms of the two components, water and alkali metal silicate of definite silica to alkali oxide ratio, the process may be said to include: (1) preparation of a stable aqueous solution of alkali metal silicate of the said ratio at a concentration which falls between two limits. These limits are determined by the points of invariant composition at which the specific hydrate desired may coexist in stable equilibrium with the next lower hydrate (or compound bearing similar phase rule relationships to the specific hydrate), together with solution and vapor, as an upper limit of concentration, and at which the specific hydrate may coexist in stable equilibrium with the next higher hydrate (or compound bearing similar phase rule relationships to the specific hydrate), together with solution and vapor as a lower limit; (2) cooling said solution to a temperature at which crystallization may be effected; (3) seeding the solution with a suitable quantity of fine grains of the desired hydrate to effect crystallization of that hydrate; (4) withdrawal of heat, accompanied by stirring, at such a rate as to effect substantially uniform growth of the crystal nuclei; (5) mechanically removing the major part of the mother liquor when the crystals have attained the desired size, and (6) effecting the crystallization of the adherent mother liquor substantially as an addition to the crystal sought and homogeneous therewith, accompanied by agitation of the crystals during the process.

Alternatively crystallization may be effected by evaporation of water after bringing the solution to a temperature within the two temperature limits which define the range of stability of the specific hydrate sought in the particular two component system. To those familiar with the theory application of the phase rule it will be obvious that no general statement of conditions under which a given hydrate can be produced can be framed to fit the varied conditions which arise when a hydrated alkali metal silicate is to be crystallized from more complicated systems than the two component system before cited. Such for example would be that system in which substantial amounts of salt (NaCl) and/or other impurities are present. A second case arises when the ratios of silica to alkali oxide in the original solution and in the pure crystals separated are different. The foregoing examples must be treated as three, or more, component systems. When the conditions of both the examples cited exist simultaneously in a system, it must be treated as a four, or more, component system.

According to the nature, the concentration and the number of impurities, or the ratio of silica to alkali oxide in the original solution, the limiting conditions under which and the ease with which any given compound may be prepared will vary. It is known for example that excess alkali, i. e., low silica: alkali oxide ratio, increases the ease and speed with which crystals may be grown in certain cases. The invention is directed to alkali metal silicate hydrates in new forms of commercial value as well as to a method for their production but it is to be understood, of course, that it is not intended to limit the invention to the specific details disclosed and that the examples cited, while representing what is at present preferred practice, might be modified as to certain of their details without departing from the spirit of my invention as set forth in the following claims.

I claim:—

1. A method of preparing definite hydrates of alkali metal silicates in the form of individual crystals or aggregates of crystals bounded substantially by crystal faces which, expressed in phase rule terminology, for any system which may be expressed in terms of the two components water and alkali metal silicate of definite silica to alkali oxide ratio comprises: (1) preparation of a stable aqueous solution of alkali metal silicate of said and application of the phase rule it will be obvious tween two limits determined by the points of invarient composition at which the specific hydrate desired may coexist in stable equilibrium with the next lower hydrate or compound bearing similar phase rule relationships to the specific hydrate, together with solution and vapor as an upper limit of concentration, and at which the specific hydrate may coexist in stable equilibrium with the next higher hydrate or other compound bearing similar phase rule relationships to the specific hydrate, together with solution and vapor as a lower limit; (2) cooling said solution to a temperature at which crystallization may be effected; (3) seeding the solution with a suitable quantity of fine grains of the desired hydrate if required to initiate or control crystallization; (4) removing heat from the solution, accompanied by stirring, at a rate such as to effect substantially uniform growth of crystal nuclei; (5) mechanically removing the major portion of the mother liquor when the crystals have attained the desired size; and (6) effecting crystallization of adherent mother liquor substantially as an addition to the crystal sought and homogeneous therewith accompanied by agitation of the crystals.

2. The method of preparing definite hydrates of alkali metal silicates according to claim 1 wherein, following step 5, the crystals are washed to remove or to alter the composition of adherent liquor followed by drying of the crystals accompanied by agitation thereof.

3. The method of preparing definite hydrates of alkali metal silicates according to claim 1 wherein, following step 5, the crystals are washed to remove or to alter the composition of adherent liquor followed by congruent crystallization of the adherent liquor substantially as an addition to the crystals sought, accompanied by agitation of the crystals.

4. The method of preparing definite hydrates of alkali metal silicates in the form of individual crystals or aggregates of crystals bounded substantially by crystal faces, which, expressed in phase rule terminology, comprises: (1) preparation of an alkali metal silicate solution either free from or containing impurities, of such silica to alkali oxide ratio and at such concentration that when said two, three, or more component system is cooled the first solid phase which can crystallize and be in stable equilibrium with mother liquor will be the hydrated alkali metal silicate desired; (2) cooling said solution to a temperature at which said crystallization may be effected; (3) seeding the solution with a suitable quantity of fine grains of the desired hydrate if required to initiate or control crystallization, (4) removing heat from the solution, accompanied by stirring, at a rate such as to effect substantially uniform growth of crystal nuclei; (5) mechanically removing the major portion of the mother liquor when the crystals have attained the desired size; and (6) effecting the crystallization of adherent mother liquor substantially as an addition to the crystal sought, accompanied by agitation of the crystals.

5. A method of preparing definite hydrates of alkali metal silicates according to claim 4 wherein, following step 5, the crystals are washed to remove or to alter the composition of adherent liquor followed by drying the crystals accompanied by agitation thereof.

6. The method of preparing definite hydrates of alkali metal silicates according to claim 4 wherein, following step 5, the crystals are washed to remove or to alter the composition of adherent liquor followed by congruent crystallization of adherent liquor substantially as an addition to the crystals sought, accompanied by agitation of the crystals.

7. The method of preparing definite hydrates of alkali metal silicates in the form of individual crystals or aggregates of crystals bounded substantially by crystal faces, which, expressed in phase rule terminology, comprises: (1) preparation of an alkali metal silicate solution either free from or containing impurities, of such silica to alkali oxide ratio and at such a temperature that when said two, three, or more component system is concentrated isothermally by evaporation, the first solid phase which can crystallize and be in stable equilibrium with mother liquor will be the hydrated alkali metal silicate desired; (2) concentrating said solution to a point at which crystallization of the desired hydrate may begin; (3) seeding the solution with a suitable quantity of fine grains of the desired hydrate if required to initiate or control crystallization; (4) evaporating the solution within the temperature limits at which the required crystals are stable in contact with mother liquor, to effect crystallization; (5) mechanically removing the major portion of the mother liquor when the crystals have attained the desired size; and (6) effecting the crystallization of adherent mother liquor substantially as an addition to the crystal sought, accompanied by agitation of the crystals.

8. The method of preparing definite hydrates of alkali metal silicates according to claim 7 wherein, following step 5, the crystals are washed to remove or to alter the composition of adherent liquor followed by drying the crystals accompanied by agitation thereof.

9. The method of preparing definite hydrates of alkali metal silicates according to claim 7 wherein, following step 5, the crystals are washed to remove or to alter the composition of adherent liquor followed by congruent crystallization of adherent liquor, substantially as an addition to the crystals sought, accompanied by agitation of the crystals.

10. The method of preparing definite hydrates of alkali metal silicates in the form of individual crystals or aggregates of crystals bounded substantially by crystal faces which comprises: (1) preparation of an alkali metal silicate solution, either free from or containing impurities, such that upon the removal of heat from the solution the first solid phase which can crystallize and be in stable equilibrium with mother liquor, will be the hydrated alkali metal silicate desired; (2) seeding said solution with a suitable quantity of the desired hydrate if required to initiate or control crystallization; (3) removal of heat from the solution within the temperature limits at which the required crystals are stable in contact with the mother liquor, to effect crystallization; (4) mechanically removing the major portion of the mother liquor when the crystals have attained the desired size; and (5) effecting the crystallization of adherent mother liquor substantially as an addition to the crystal sought, accompanied by agitation of the crystals.

11. The method of preparing definite hydrates of alkali metal silicates in the form of individual crystals or aggregates of crystals bounded substantially by crystal faces which comprises: (1) preparation of an alkali metal silicate solution, either free from or containing impurities such that upon concentration of the solution the first solid phase which can crystallize and be in stable equilibrium with mother liquor will be the hydrated alkali metal silicate desired; (2) seeding said solution with a suitable quantity of the desired hydrate, if required, to initiate or control crystallization; (3) concentration of the solution within the temperature limits at which the required crystals are stable in contact with the mother liquor, to effect crystallization; (4) mechanically removing the major portion of the mother liquor when the crystals have attained the desired size; and (5) effecting the crystallization of adherent mother liquor substantially as an addition to the crystal sought, accompanied by agitation of the crystals.

12. The method of preparing definite hydrates of alkali metal silicates according to claim 10 wherein, following step 4, the crystals are washed to remove or to alter the composition of adherent liquor, followed by drying of the crystals, accompanied by agitation thereof.

13. The method of preparing definite hydrates of alkali metal silicates according to claim 10 wherein, following step 4, the crystals are washed to remove or to alter the composition of adherent liquor followed by congruent crystallization of adherent liquor substantially as an addition to the crystals sought, accompanied by agitation of the crystals.

14. In a method of making a definite crystalline hydrate of an alkali metal silicate, the steps which include preparing a solution of the said hydrate, establishing the solution at a temperature below the melting point of the crystal sought but high enough to keep the solution relatively fluid, initiating crystallization while substantially maintaining the temperature, mechanically separating the crystals from the liquor without material reduction of the temperature and, therefore, of the fluidity of the residual mother liquor, and drying the separated crystals at substantially the same temperature.

15. The method of claim 14 wherein the drying of the crystals is accompanied with agitation thereof.

16. In a method of making a definite crystalline hydrate of an alkali metal silicate, the steps which include preparing a solution of the said hydrate, establishing the solution at a temperature below the melting point of the crystal sought but high enough to keep the solution relatively fluid, seeding with a quantity of the desired crystals while substantially maintaining the temperature, mechanically separating the crystals from the liquor without material reduction of the temperature and, therefore, of the fluidity of the residual mother liquor, and drying the separated crystals at substantially the same temperature.

17. The method of claim 16 wherein the drying of the said crystals is accompanied with agitation thereof.

18. The method of producing sodium metasilicate pentahydrate which includes the preparation of an aqueous silicate solution having a composition approximately 1.00 $Na_2O$ .995 $SiO_2$ 5.9 $H_2O$; adjusting the temperature of the solution to 65° C.; seeding with approximately 5 pounds of fine grained crystalline sodium metasilicate pentahydrate for each 2000 pounds of solution; maintaining the temperature of all portions of the solution substantially the same; stirring to prevent any considerable sedimentation of the crystals; removing heat without forming any large number of new nuclei; centrifuging when the crystal growth has proceeded to a point yielding a viscous magma containing 40 or more percent of its weight of crystals; maintaining the temperature during centrifuging below the melting point of the crystals but as high as may be convenient; and removing the crystals and agitating them gently.

CHESTER L. BAKER.

---

CERTIFICATE OF CORRECTION.

Patent No. 2,017,561.　　　　　　　　　　　　　　　　October 15, 1935.

CHESTER L. BAKER.

It is hereby certified that error appears in the printed specification of the above numbered patent requiring correction as follows: Page 4, second column, line 75, claim 1, for the words "and application of the phase rule it will be obvious" read definite ratio at a concentration which falls be-; and that the said Letters Patent should be read with this correction therein that the same may conform to the record of the case in the Patent Office.

Signed and sealed this 12th day of November, A. D. 1935.

Leslie Frazer (Seal)　　　　　　　　　　　　　　　　　Acting Commissioner of Patents.

CERTIFICATE OF CORRECTION.

Patent No. 2,017,561. October 15, 1935.

CHESTER L. BAKER.

It is hereby certified that error appears in the printed specification of the above numbered patent requiring correction as follows: Page 4, second column, line 75, claim 1, for the words "and application of the phase rule it will be obvious" read definite ratio at a concentration which falls be-; and that the said Letters Patent should be read with this correction therein that the same may conform to the record of the case in the Patent Office.

Signed and sealed this 12th day of November, A. D. 1935.

Leslie Frazer (Seal) Acting Commissioner of Patents.